W. HODGSON.
FLUID TEMPERATURE REGULATOR.
APPLICATION FILED MAY 24, 1919.
1,337,701.
Patented Apr. 20, 1920.
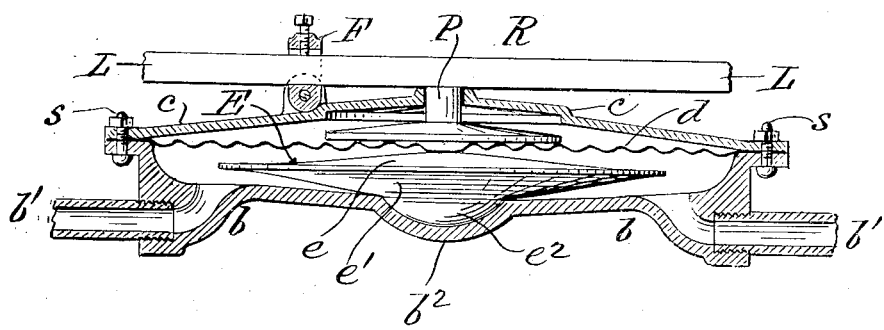
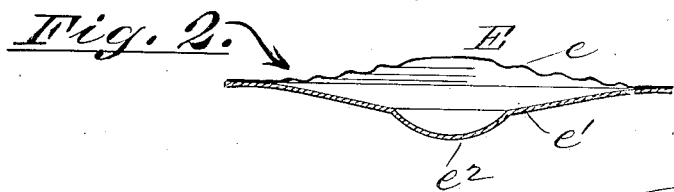
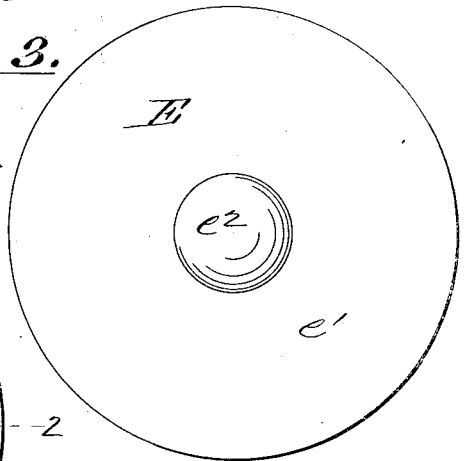
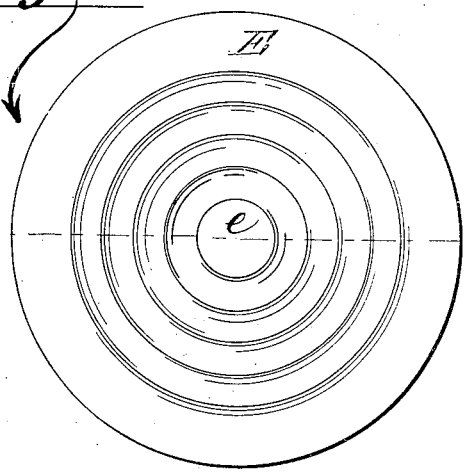
Inventor
William Hodgson,
By his Attorney,
Geo. W. Miatt

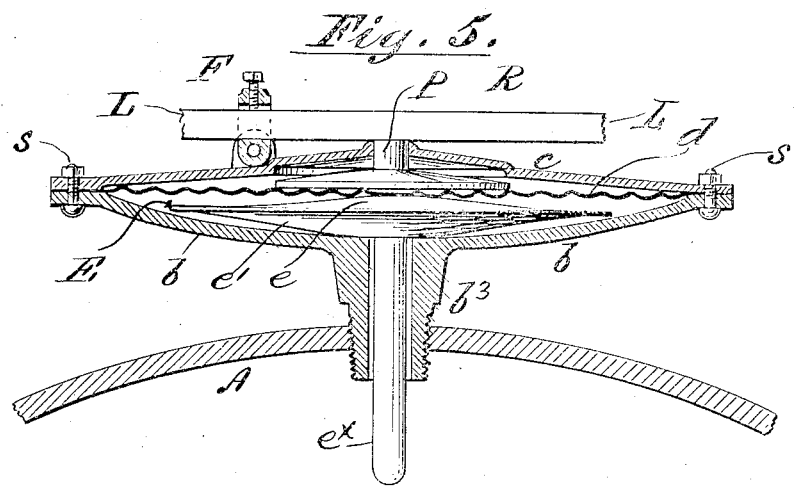
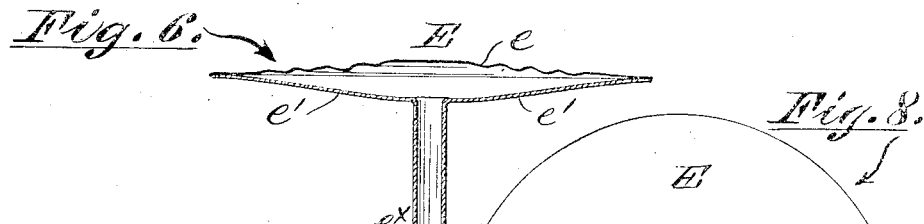
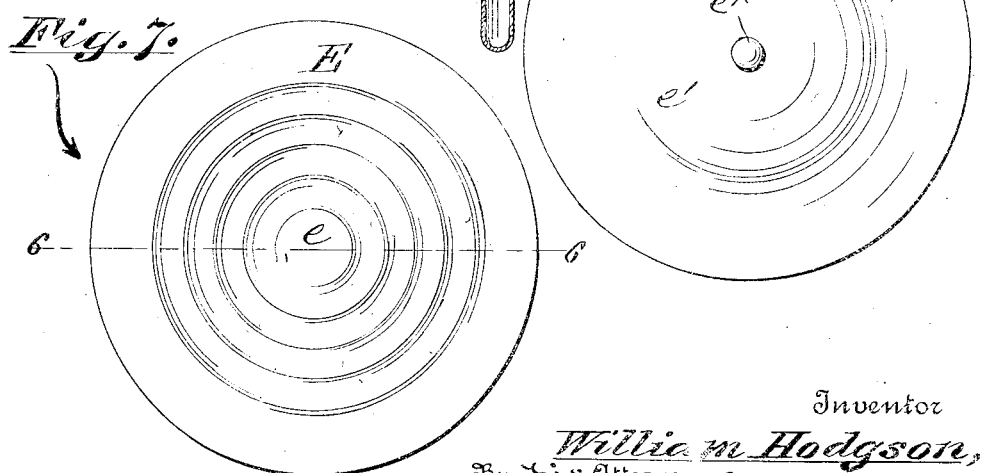

UNITED STATES PATENT OFFICE.

WILLIAM HODGSON, OF NEW YORK, N. Y.

FLUID-TEMPERATURE REGULATOR.

1,337,701. Specification of Letters Patent. Patented Apr. 20, 1920.

Application filed May 24, 1919. Serial No. 299,639.

*To all whom it may concern:*

Be it known that I, WILLIAM HODGSON, a citizen of the United States, and a resident of the borough of Bronx, county of Bronx, city and State of New York, have invented certain new and useful Improvements in Fluid-Temperature Regulators, of which the following is a specification.

My improvements relate to the class of regulators in which a motion-transmitting plunger, which actuates valve or damper operating mechanism, rests upon the upper side of a flexible diaphragm, the lower side of which is subjected to variations in pressure; and particularly to the type of such regulators in which said diaphragm is actuated by the expansion and contraction of a confined volatile substance, as set forth for instance in Letters Patent No. 1,284,895, issued to me Nov. 12, 1918, and like the present invention designed to effect the automatic control of liquid heating apparatus in a manner well known in the art.

The ether or other volatile fluid used as a vehicle for actuating the regulator by variations of temperature of the liquid circulation to be controlled is extremely penetrative and hard to confine, and the life and utility of these regulators of circulatory liquid temperatures has heretofore been limited to the length of maintenance of a prescribed volume of such volatile vehicle within the so called pressure chamber beneath the diaphragm upon which the aforesaid motion-transmitting plunger rests. In other words, as heretofore constructed, the volatile substance has been confined between the flexible diaphragm and the base plate of the regulator, the diaphragm forming an integral part thereof, so that upon the diminution or escape of the prescribed quantity of volatile fluid vehicle from any cause, as by leakage, or percolation through the base plate, the whole regulator has been rendered practically inoperative and useless, and had to be discarded bodily, or sent back to the manufacturer for repair and recharging with a volatile vehicle,—the latter course involving an expense approximating the cost of a new regulator, not to mention the delay and inconvenience involved.

It is the main object of my present invention to obviate this difficulty by means of a thermotic control element, adapted for use within the regulator casing but independent thereof and detachable therefrom, so that a defective or depleted thermotic control element may be readily removed and another substituted with little inconvenience or delay,—such replacements being kept in reserve for such emergencies, and being so made as to be proof against deterioration except from wear in the course of actual use in a regulator.

In the accompanying drawings,

Figure 1, is a central vertical sectional elevation of a regulator embodying the essential features of my invention;

Fig. 2, is a section of my thermotic control element, taken upon plane of line 2—2, Fig. 4;

Fig. 3, is a view of the under side of the form of thermotic control element shown in Fig. 1;

Fig. 4, is a view of the upper side thereof;

Fig. 5, is a central vertical sectional elevation of my improved regulator adapted for attachment, directly to a boiler or the like;

Fig. 6, is a sectional view of the thermotic control element shown in Fig. 5, taken upon plane of line 6—6, Fig. 7;

Fig. 7, is a view of the upper side of said thermotic control element;

Fig. 8, is a view of the under side thereof.

My thermotic control element E, consists essentially of an elastic resilient diaphragm $e$, preferably of relatively thin but dense copper of, say, one thirty second of an inch in thickness, hermetically sealed peripherally to a dish-shaped plate $e'$, of relatively stiff rolled and drawn brass or other dense metal practically impervious to the volatile fluid vehicle which is confined between it and the diaphragm $e$,—the dish plate $e'$, sustaining the more flexible diaphragm $e$, in operative position and extension.

In Fig. 1, of the accompanying drawings, my thermotic control element E, is shown as interposed directly and bodily in the path of a liquid circulation through the casing of the regulator R, in which case the base plate $b$, is formed with inlet and outlet ports $b'$, $b'$, and preferably also with a central depression $b^2$, for the accommodation of a protuberant portion $e^2$, of the dish plate $e'$, of the control element E, whereby the latter is centralized in alinement with the regulator diaphragm $d$.

In both Figs. 1 and 5, the regulator diaphragm $d$, is secured peripherally and hermetically to and between the base plate $b$, and the cap plate c, as heretofore, and sustains the plunger P, which transmits motion to the valve or damper actuating lever L, which latter extends through a fulcrum link F, mounted on the cap plate c. In Fig. 5, however the regulator R, is designed for use in connection with a water or other liquid boiler or hot liquid container A, of any kind, and hence its base plate b, is formed with an external threaded nipple $b^3$, for engagement with the shell of the container A, through the hollow center of which nipple $b^3$, a hollow extension $e^x$, of my thermotic control element E, protrudes downward into the liquid space in said container A, so as to expose the volatile fluid vehicle in the element E, to the temperature of the liquid in said container. Otherwise the construction and operation of regulators shown in Figs. 1 and 5, are essentially the same in that my thermotic control element E, actuates the plunger P, indirectly through the medium of the regulator diaphragm d, the main function of which latter in such case is to exclude atmospheric pressure (admitted around the stem of the plunger P, which must be free of restraint) from the space between it and the base plate b.

In these modifications of my invention it will be seen that by the removal of the securing bolts s, (or equivalent securing means) which bind the cap c, to the base plate b, a thermotic control element E, may be easily removed from the regulator R, and another replaced therein, without otherwise disturbing or disarranging the parts.

It will thus be seen that my thermotic control element E, is essentially an integral unitary structure independent of and detachable from the other parts of the regulator, so as to fulfil all the requirements of a replaceable member adapted to attain the same results functioned by the so called expansion chamber heretofore constituted by and between the regulator diaphragm d, and the regulator base plate b,—with the additional advantage that the volatile fluid vehicle cannot percolate through said base plate b, as long as my thermotic control element remains intact.

What I claim as my invention and desire to secure by Letters Patent is:

1. The combination with a fluid temperature regulator of the character designated, comprising a fluid pressure chamber having a peripherally attached and hermetically sealed diaphragm forming one side of said fluid pressure chamber, and a power transmitting plunger resting loosely on said regulator diaphragm, of a thermotic control element positioned in said pressure chamber between its base and said regulator diaphragm, and comprising a unitary structure detachable from the other parts of the regulator and consisting of an elastic resilient diaphragm and a sustaining plate hermetically joined and confining between them a volatile fluid, for the purpose described.

2. The combination with a fluid temperature regulator of the character designated, comprising a fluid pressure chamber having a peripherally attached and hermetically sealed diaphragm forming one side of said fluid pressure chamber, and a power transmitting plunger resting loosely on said regulator diaphragm, of a thermotic control element positioned in said pressure chamber between its base and said regulator diaphragm, and comprising a unitary structure detachable from the other parts of the regulator and consisting of an elastic resilient diaphragm and a dish-shaped sustaining plate hermetically joined and confining between them a volatile fluid, for the purpose described.

3. The combination with a fluid temperature regulator of the character designated, comprising a fluid pressure chamber having a peripherally attached and hermetically sealed diaphragm forming one side of said fluid pressure chamber, and a power transmitting plunger resting loosely on said regulator diaphragm, of a thermotic control element positioned in said pressure chamber between its base and said regulator diaphragm, and comprising a unitary structure detachable from the other parts of the regulator and consisting of an elastic resilient copper diaphragm and a sustaining plate of rolled and drawn brass, said two parts being hermetically joined and confining between them a volatile fluid, for the purpose described.

WILLIAM HODGSON.

Witnesses:
 GEO. WM. MIATT,
 DOROTHY MIATT.